May 14, 1929.  J. A. OYA  1,713,051
AUTOMOBILE LIGHT INDICATOR
Filed July 16, 1927
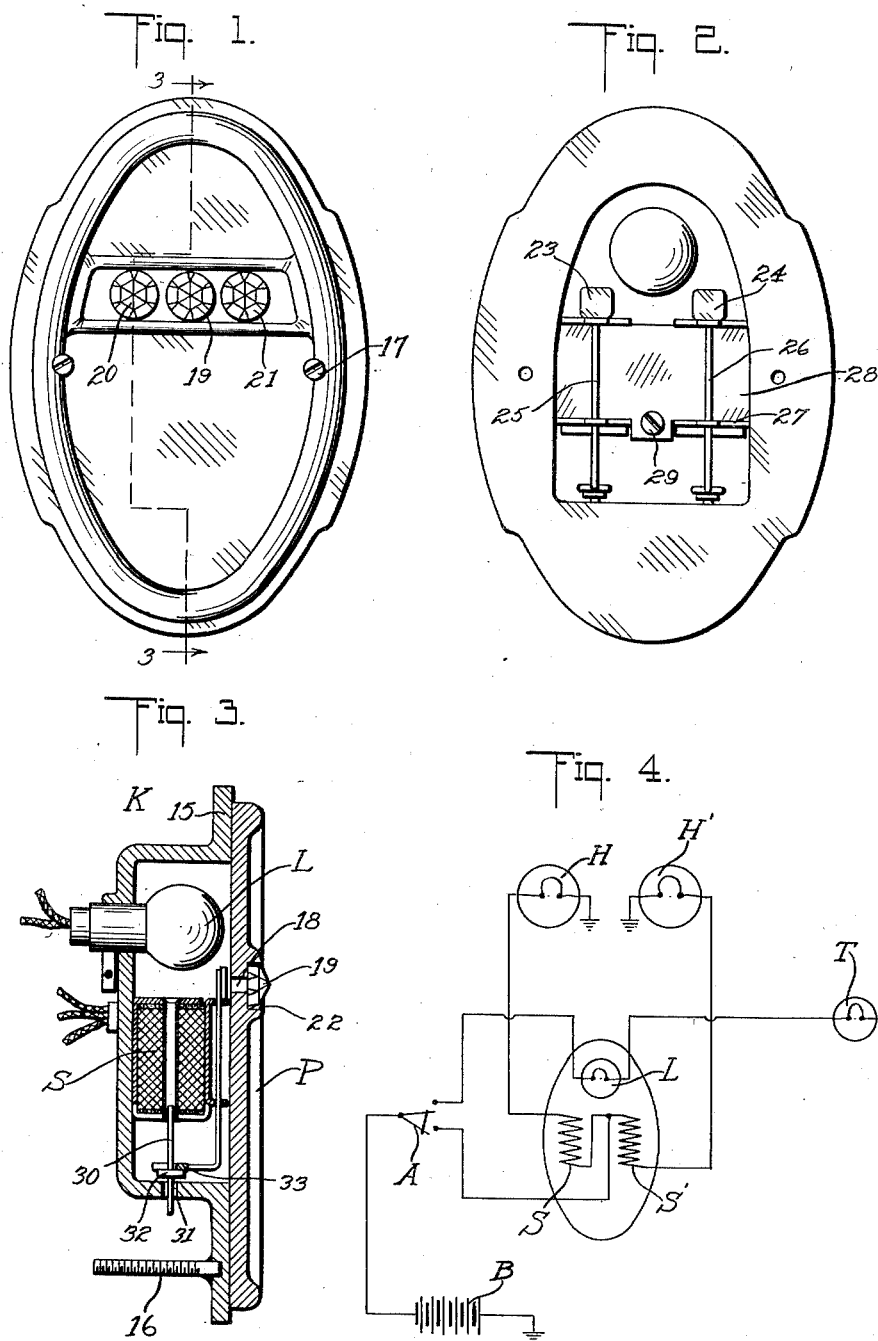
INVENTOR
John A. Oya;
BY Munn & Co.
ATTORNEY Patented May 14, 1929.

1,713,051

UNITED STATES PATENT OFFICE.

JOHN A. OYA, OF HONOLULU, TERRITORY OF HAWAII.

AUTOMOBILE LIGHT INDICATOR.

Application filed July 16, 1927. Serial No. 206,243.

My invention relates to and has for its purpose the provision of an indicating device particularly adapted, although not necessarily, for association with the lighting circuits of the motor vehicle to positively indicate to the operator whether the head and tail lights are illuminated when intended, so that should any one light be extinguished for any reason such as open circuits, loose connections, or burnt out bulbs, such failure of the light to be or remain illuminated will be indicated to the operator by the device.

I will describe only one form of automobile light indicating device embodying my invention, and will then point out the novel features thereof in claims.

In the accompanying drawings,

Fig. 1 is a view showing in front elevation one form of light indicating device embodying my invention;

Fig. 2 is a view similar to Fig. 1 with the cover plate removed;

Fig. 3 is a vertical sectional view taken on the line 3—3 of Fig. 1; and

Fig. 4 is a view showing diametrically the indicating device incorporated in the lighting circuits of the motor vehicle.

Referring specifically to the drawings, my invention in its present embodiment comprises a casing K having an attaching flange 15 provided with screw threaded shanks 16 adapted to extend through the instrument door and to be provided with nuts (not shown) by which the casing as a unit can be secured within a suitable opening of the instrument door. The front of the casing is closed by a cover plate P removably secured to the casing by screws 17, and provided in the present instance with three openings 18 having colored and facetted lenses 19, 20 and 21, respectively, mounted on the upper ends of rods 25 and 26, respectively, with the latter vertically movable in ears 27 of a plate 28 secured to the casing by means of a screw 29. By this hook the shutters are free to gravitate to the position shown in Figs. 2 and 3 wherein they close the openings of the respective lenses 20 and 21 to prevent illumination of the latter by the lamp L. To uncover the openings and thus permit illumination of the lenses, the shutters are adapted to be elevated by the provision of electro-responsive devices, which in the present instance are a pair of solenoids S and S'. These solenoids are secured within the casing K in the manner illustrated in Fig. 3, so that their cores 30 are movable vertically within the casing and are adapted to be elevated when the windings of the solenoids are energized. The lower ends of the cores are movable through opening 31 in the bottom of the casing, and they are provided with rings 32 fixed thereto and positioned to engage slotted heads 33 on the lower angular bent ends of the rods 25 and 26. These heads 33 by virtue of their being slotted can be applied laterally to the cores 30 above the rings 32, so that when the cores are elevated the rings in their upward movement will engage the heads and thereby lift the rods to move the shutters to uncover the openings 18.

Referring to Fig. 4 I have shown the indicating device incorporated in the head light and tail light circuits of a motor vehicle lighting system. The tail light indicated at T is provided with a circuit including the lamp L and a battery B, the tail light and battery B being grounded as shown. The head lights are indicated at H' and each is provided with a circuit, one side of which is grounded while the other side is connected, respectively, to the solenoid windings S and S'. A two pole switch A is employed to connect the battery B to the circuits for the lights H, H' and T, and in such manner that the solenoids are connected in parallel.

The operation of the indicating device is as follows: With the switch A in closed position, current from the battery B is supplied to the lamps L and T to illuminate the latter, while current is also supplied to the lamps H and H' through the unit windings. With the lamp L illuminated the lens 19 is likewise illuminated, thus indicating to the observer that a tail light T is illuminated. With illumination of the headlights the units are energized, thus moving the shutters 23 and 24 to uncover the openings 18 and thereby permit illumination of the lenses 20 and 21, and thus indicating to the observer that both headlights are illuminated.

Should either headlight be extinguished for any other reason than opening of the switch A the respective unit will be immediately disengaged thereby permitting the respective shutter to gravitate to covering position of the corresponding opening 18 and thus preventing further illumination of the respective lens by the lamp L. In this manner the extinguishing of either headlight is immediately indicated. Should the tail light T be extinguished for any reason than opening of the switch A, the lamp L will likewise be extinguished, thus preventing further illumination of the lens 19 and thereby indicating to the observer the failure of the tail light.

In practice the lenses 20 and 21 are formed of glass of the same color, but of a color different from that of the lens 19 in order that one may readily determine the particular lamp and circuit affected.

Although I have herein shown and described only one form of automobile light indicating device embodying my invention, it is to be understood that various changes and modifications may be made herein without departing from the spirit of the invention and the spirit and scope of the appended claims.

I claim as my invention:

1. In combination, headlights, a casing having three openings therein, a signal lamp adapted to illuminate the openings, shutters for two of the openings, a pair of electro-responsive devices for actuating the shutters, a tail light, a circuit for the tail light and signal lamp in which they are connected in series so that the signal lamp will be extinguished concurrently with the tail light, a second circuit including the headlights and electro-responsive devices with one headlight and one of said devices in series and in parallel with respect to the other headlight and device so that one device or the other will be deenergized according as the respective headlight is extinguished to cause the respective shutter to close the corresponding opening, and a source of current for said circuits.

2. In combination, a casing having a front wall formed with a display opening and a bottom wall provided with an opening, a lamp in the casing, a solenoid in the casing having a movable core extending into the bottom wall opening of the casing, a frame in the casing having ears, an L-shaped rod having its vertical portion slidable in the ears, a shutter on the upper end of the rod normally closing the display opening, a head on the free end of the horizontal portion of the rod slotted to receive the core, and a projection on the core beneath the head whereby, when the solenoid is energized, the core will be elevated to cause the projection to lift the head and thus elevate the rod for moving the shutter clear of the display opening.

JOHN A. OYA.